No. 615,432. Patented Dec. 6, 1898.
J. W. COURT.
FISH SCALER.
(Application filed Dec. 31, 1897.)

(No Model.)

Witnesses
Herbert Bradley
Edward K. Allen

Inventor
John W. Court.
Octavius Knight
By
Attorney

THE NORRIS PETERS CO., PHOTO-LITHO., WASHINGTON, D. C.

UNITED STATES PATENT OFFICE.

JOHN W. COURT, OF NEW YORK, N. Y.

FISH-SCALER.

SPECIFICATION forming part of Letters Patent No. 615,432, dated December 6, 1898.

Application filed December 31, 1897. Serial No. 664,809. (No model.)

*To all whom it may concern:*

Be it known that I, JOHN W. COURT, a citizen of the United States, and a resident of the city of New York, (Brooklyn,) in the county of Kings and State of New York, have invented certain new and useful Improvements in Fish-Scalers, of which the following is a specification.

The object of my invention is to provide an instrument by means of which the scales may be removed from fish with ease and thoroughness and at the same time collected by the instrument and prevented from scattering.

My invention comprises a scale-receiver having an open base with ends and parallel sides providing downwardly-presented scraping edges and a cross-blade extending between the parallel sides within the scraper. The base is preferably quadrilateral and rectangular, and the parallel sides, cross-blade, and one end are toothed on their under edges, while the other end preferably has a smooth edge, so that the parallel toothed sides afford guides to insure the movement of the instrument in a right line, while the toothed cross-blade and toothed end which follows the cross-blade in the scraping movement are the effective parts in removing the scales. The forward or advance end being smooth on the edge it follows that the scales are all removed while in contact with the scraping parts within the receiver. The cross-blade is preferably curved or bowed and set angularly in the receiver.

My invention is fully illustrated in the accompanying drawings, in which—

Figure 1:
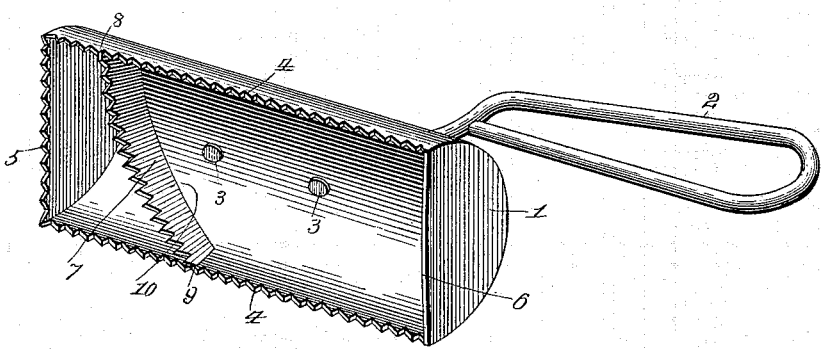
Figure 2:
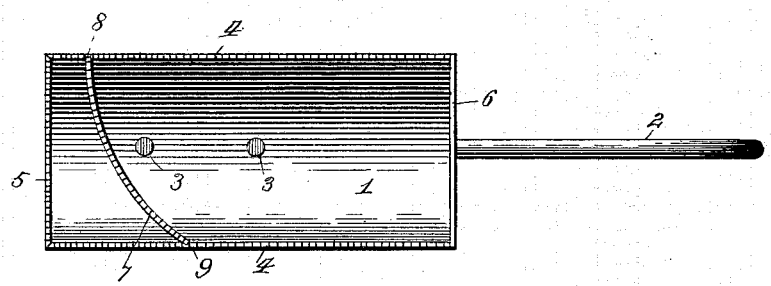
Figure 3:
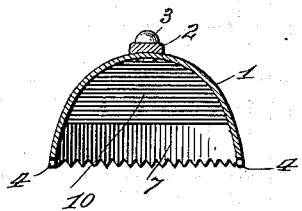

Figure 1 is a perspective view, and Figs. 2 and 3 are respectively a bottom view and a transverse section, of the instrument embodying my said invention.

1 represents the scale-receiver, which is preferably of curved section and has a suitable handle 2 secured to its top by means of rivets 3 or equivalent form of attachment, and the base of which receiver is formed of the parallel sides with toothed edges, as shown at 4, and the rear and forward ends 5 and 6, the edges of which are respectively toothed and straight. Secured within the receiver is a cross-blade 7, the edge of which is toothed and lies in the same plane as the edges of the receiver. Said cross-blade has its ends secured to the sides 4 at 8 and 9, respectively, whereby said blade is given an inclined or angular set relatively to the direction of movement of the instrument. The said blade is, furthermore, of such dimension transverse to its length as to leave an opening 10 above it in the receptacle, and the blade is preferably curved, as shown in Fig. 2.

In use the implement is grasped by the handle 2 and drawn over the fish to be scaled in a direction parallel to the sides 4. The sides thereby become guides for directing the movement and defining the area over which the scales are removed by each stroke. The front edge 6 being smooth prevents the scales being dislodged in front of the instrument, while the toothed edges of the blade 7 and rear end 5 effectively engage and completely remove all the scales with which they come in contact between the lines of the sides 4.

From the above description it will be seen that the principal work of removing the scales is performed by the internal blade 7, following which the serrated end 5 of the box or scale-receiver effectually removes any remaining and partially-dislodged scales, so as to make clean work at each stroke. The oblique position and curved form of the internal serrated blade 7, by which the scales are chiefly dislodged, are of considerable practical importance, causing the toothed edge to engage the scales with an oblique shearing action instead of abruptly, as would be the case with a blade perpendicular to or directly across the line of movement. The oblique position of the blade also affords much better clearance for the detached scales, which are thus much more effectually carried up and over the blade into the rear end of the hollow receiver. Hence but little work is left to be done by the final scraper 5, and the remaining scales removed by this are also retained within the receptacle. It will thus be seen that the instrument provides a convenient means for removing the scales and avoiding the distribution of the same over the person of the operator, which generally results from the use of the instruments heretofore constructed.

Having thus described my invention, the following is what I claim as new therein and desire to secure by Letters Patent:

1. In a fish-scraper, the combination of a scale-receiver having an open base formed by an end and parallel sides of the receiver, and of which the edges are toothed for engagement with and dislodgment of the scales, and a cross-blade secured between the sides within the receiver at an oblique angle to the same and having a toothed under edge in the same plane with the edges of the sides and end; substantially as and for the purposes set forth.

2. In a fish-scaler, the combination of a scale-receiver having an open base formed by the edges of the ends and sides of the receiver, and a cross-blade secured between the sides of the receiver at an oblique angle with its under edge in the same plane with the edges of the sides and ends of the receiver; the edges of the sides, the cross-blade and one end being toothed while the edge of the other end is straight, substantially as and for the purposes herein set forth.

3. The herein-described fish-scaler comprising an open-based receiver with parallel guiding edges on its sides and a cross-blade secured within the receptacle between the sides at an oblique angle to the same and with a space above it in said receptacle; substantially as and for the purposes set forth.

4. In a fish-scaler, the combination of the scale-receiver, of curved section having a rectangular open base formed by the edges of the ends and sides of the receiver, a cross-blade bowed or curved and angularly set within the receiver between the sides, with its under edge in the same plane with the edges of the ends and sides and with a space above it within the receiver, and a handle suitably attached to the receiver; the edges of the sides, of the cross-blade, and of one end of the receiver being toothed for engagement with the scales and the edge of the other end of the receiver, being the advance end in the movement of the instrument in use, being straight or smooth; all substantially as herein shown and for the purposes set forth.

5. The combination with an open-based fish-scale receiver having ends and parallel sides, teeth formed on the edges of the parallel sides and one of the ends, of a toothed cross-blade set angularly in the receiver with its teeth in the same plane as those on the sides and end of the receiver, substantially as described.

JOHN W. COURT.

Witnesses:
OCTAVIUS KNIGHT,
JOSIAH H. PECK.